United States Patent
Lin et al.

(10) Patent No.: US 9,622,366 B2
(45) Date of Patent: Apr. 11, 2017

(54) DISPLAY PANEL WITH COIL LAYER FOR WIRELESS CHARGING

(71) Applicant: E Ink Holdings Inc., Hsinchu (TW)

(72) Inventors: Chin-Wen Lin, Hsinchu (TW);
Po-Hsin Lin, Hsinchu (TW);
Chi-Liang Wu, Hsinchu (TW);
Ted-Hong Shinn, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 480 days.

(21) Appl. No.: 13/891,208

(22) Filed: May 10, 2013

(65) Prior Publication Data
US 2014/0049882 A1    Feb. 20, 2014

(30) Foreign Application Priority Data

Aug. 17, 2012   (TW) .............. 101129898 A

(51) Int. Cl.
| H05K 7/00 | (2006.01) |
| G06F 1/16 | (2006.01) |
| G06F 1/26 | (2006.01) |
| H02J 7/02 | (2016.01) |

(52) U.S. Cl.
CPC ............. *H05K 7/00* (2013.01); *G06F 1/1601* (2013.01); *G06F 1/26* (2013.01); *H02J 7/025* (2013.01)

(58) Field of Classification Search
CPC ........................................ H02J 7/025
USPC .......................................... 320/108
See application file for complete search history.

(56) References Cited

U.S. PATENT DOCUMENTS

| 7,772,802 B2 | 8/2010 | Manico et al. |
| 8,169,185 B2 | 5/2012 | Partovi et al. |
| 2005/0122564 A1 | 6/2005 | Zehner et al. |
| 2008/0055303 A1* | 3/2008 | Ikeda .............. G06F 1/1601 |
|  |  | 345/214 |
| 2008/0258679 A1 | 10/2008 | Manico et al. |
| 2009/0140692 A1 | 6/2009 | Hwang |
| 2010/0001683 A1 | 1/2010 | Huang |
| 2011/0050164 A1 | 3/2011 | Partovi et al. |
| 2011/0307309 A1 | 12/2011 | Forster et al. |
| 2012/0052923 A1 | 3/2012 | Park |
| 2012/0069506 A1* | 3/2012 | Lai .................. H02J 7/025 |
|  |  | 361/679.01 |
| 2012/0074899 A1* | 3/2012 | Tsai .................. H02J 7/025 |
|  |  | 320/108 |

(Continued)

FOREIGN PATENT DOCUMENTS

| CN | 201533181 | 7/2010 |
| CN | 201533185 | 7/2010 |

(Continued)

*Primary Examiner* — Richard Isla Rodas
*Assistant Examiner* — Manuel Hernandez
(74) *Attorney, Agent, or Firm* — Jianq Chyun IP Office

(57) ABSTRACT

A display panel having a wireless charging function is provided, and the display panel includes a first substrate, an induction coil layer, a display pixel layer, and a second substrate. The induction coil layer is disposed on the first substrate. The induction coil layer includes at least one induction coil. The induction coil layer is adapted for collaborating with a wireless charging power supply, such that the induction coil layer executes the wireless charging function. The display pixel layer is disposed on the induction coil layer. The second substrate is disposed on the display pixel layer.

11 Claims, 4 Drawing Sheets

(56) References Cited

U.S. PATENT DOCUMENTS

| | | |
|---|---|---|
| 2012/0098349 A1 | 4/2012 | Kim et al. |
| 2012/0112553 A1 | 5/2012 | Stoner, Jr. et al. |
| 2013/0119773 A1* | 5/2013 | Davis .................. H02J 5/005 307/104 |
| 2014/0146011 A1* | 5/2014 | Huang .................. G06F 3/0412 345/174 |
| 2014/0375262 A1* | 12/2014 | Yamaguchi ............ H01Q 1/521 320/108 |

FOREIGN PATENT DOCUMENTS

| | | | |
|---|---|---|---|
| CN | 201698665 | 1/2011 | |
| CN | 102035221 | 4/2011 | |
| CN | 102104285 A * | 6/2011 | |
| CN | 102419674 A * | 4/2012 | |
| CN | 103093736 | 5/2013 | |
| CN | 103376591 | 10/2013 | |
| JP | 2012008459 | 1/2012 | |
| KR | WO 2014061987 A1 * | 4/2014 | ......... H01F 27/2804 |
| TW | 201143251 | 12/2011 | |
| WO | 2012094813 | 7/2012 | |

* cited by examiner

DISPLAY PANEL WITH COIL LAYER FOR WIRELESS CHARGING

CROSS-REFERENCE TO RELATED APPLICATION

This application claims the priority benefit of Taiwan application serial no. 101129898, filed on Aug. 17, 2012. The entirety of the above-mentioned patent application is hereby incorporated by reference herein and made a part of this specification.

BACKGROUND OF THE INVENTION

Field of the Invention

The invention relates to a display panel and more particularly relates to a display panel that has a wireless charging function.

Description of Related Art

As display technology develops, people have growing demand for various types of displays, such as liquid crystal display (LCD), organic light emitting diode display (OLED display), and electrophoretic display (EPD). In order to make displays more convenient, displays are gradually developed to be miniaturized and portable. Even though displays have the potential of miniaturization and portability, it will be less convenient to use the displays if the power supplies or batteries that supply power to the displays cannot be miniaturized or made portable. Especially for displays of high resolution and high brightness which consume more power, it is difficult for portable power supplies to constantly provide sufficient power, which hinders the development of miniaturization and portability of the displays.

In order to expedite the advance in miniaturization and portability, wireless charging technology may be applied to greatly increase the convenience in using the displays. According to the Faraday's law of electromagnetic induction, the wireless charging technology may be used to charge consumer electronic products without any power cord. Simply put, when a current passes through a wire, a magnetic field is generated by the wire to establish an induction voltage to the nearby coils, and the induction voltage provides a charging current. Wireless charging is to charge consumer electronic products by using the induction voltage. However, in order to achieve wireless charging, it is usually required to dispose an induction coil on the consumer electronic products for receiving wireless power, and the induction coil is usually large and heavy, which increases the volume and weight of the consumer electronic products. Therefore, how to combine wireless charging technology with the displays without greatly increasing the volume and weight has become an important issue now.

SUMMARY OF THE INVENTION

The invention provides a display panel having a wireless charging function, and a light-weighted and simplified induction coil disposed therein is conducive to preventing a large increase of the volume and weight of the display panel.

The invention provides a display panel having a wireless charging function, and the display panel includes a first substrate, an induction coil layer, a display pixel layer, and a second substrate. The induction coil layer is disposed on the first substrate. The induction coil layer includes at least one induction coil. The induction coil layer is adapted for collaborating with a wireless charging power supply, such that the induction coil layer executes the wireless charging function. The display pixel layer is disposed on the induction coil layer. The second substrate is disposed on the display pixel layer.

In an embodiment of the invention, the display pixel layer includes an active area and a peripheral circuit area adjacent to the active area. The induction coil is disposed in an area of the induction coil layer that corresponds to the peripheral circuit area.

In an embodiment of the invention, the induction coil is further disposed in an area of the induction coil layer that corresponds to the active area.

In an embodiment of the invention, a shape of the induction coil is circular or elliptic.

In an embodiment of the invention, the shape of the induction coil is polygonal.

In an embodiment of the invention, the induction coil receives an induction electromagnetic wave supplied by the wireless charging power supply and generates an induction electric energy accordingly.

In an embodiment of the invention, the induction coil layer includes a first output end and a second output end. The induction coil layer outputs an induction electric energy generated by the induction coil layer to an electric energy storage device via the first output end and the second output end.

In an embodiment of the invention, the first substrate is a hard substrate.

In an embodiment of the invention, the first substrate is a flexible substrate.

In an embodiment of the invention, a material of the induction coil includes a metal or a conductive metal oxide.

Based on the above, in the exemplary embodiments of the invention, the induction coil is disposed on the first substrate of the display panel, such that the display panel has the wireless charging function without greatly increasing the volume and weight thereof.

To make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

FIG. 3b is a schematic view illustrating an alteration of the display panel according to the embodiment of FIG. 3a.

DETAILED DESCRIPTION OF DISCLOSED EXEMPLARY EMBODIMENTS

Figure 1:
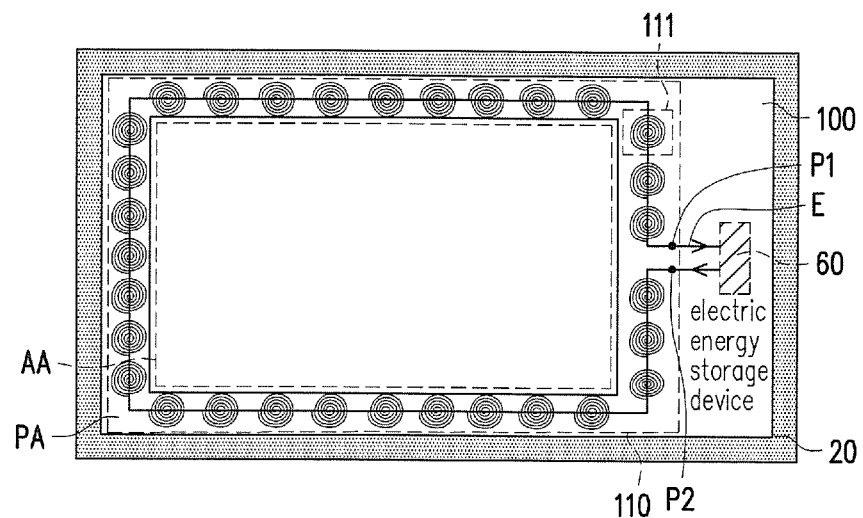
FIG. 1 is a schematic top view of a display panel according to an embodiment of the invention.
Figure 2:
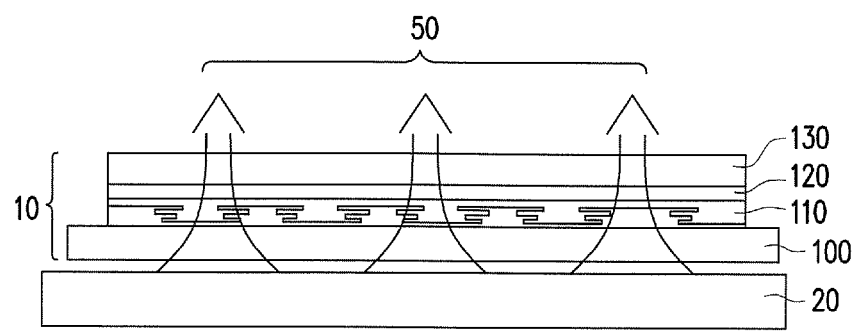
FIG. 2 is a schematic cross-sectional view of the display panel of FIG. 1.

FIG. 1 is a schematic top view of a display panel according to an embodiment of the invention. FIG. 2 is a schematic cross-sectional view of the display panel of FIG.

1. Please refer to FIG. 1 and FIG. 2. In this embodiment, a display panel 10 includes a first substrate 100, an induction coil layer 110, a display pixel layer 120, and a second substrate 130. More specifically, the first substrate 100 and the second substrate 130 may be hard substrates, such as glass, or flexible substrates, such as plastic, but the invention is not limited to the above. The induction coil layer 110 is disposed on the first substrate 100 and includes at least one induction coil 111. In an embodiment of the invention, a material of the induction coil 111 includes a metal or a conductive metal oxide. Specifically, the metal material of the induction coil 111 may be gold, silver, aluminum, nickel, copper, or chromium, for example, but the invention is not limited to the foregoing. The conductive metal oxide material of the induction coil 111 may be indium tin oxide (ITO), for example, but the invention is not limited thereto. The induction coil 111 is disposed on the first substrate 100 by sputtering, deposition, coating, or etching, for example. The induction coil layer 110 including the induction coil 111 is disposed on the first substrate 100, so as to avoid the increase of the thickness and weight of the display panel 10 due to the installment of an additional power supply module. In this embodiment, the induction coil layer 110 collaborates with a wireless charging power supply 20 to execute the wireless charging function. To be more specific, the induction coil 111 receives an induction electromagnetic wave 50 supplied by the wireless charging power supply 20 and generates an induction electric energy E accordingly. A type of the induction electric energy E may be an induction voltage or a corresponding induction current, for example. Moreover, the induction coil layer 110 includes a first output end P1 and a second output end P2 and outputs the generated induction electric energy E to an electric energy storage device 60 via the first output end P1 and the second output end P2. Therefore, when collaborating with the wireless charging power supply 20 to execute the wireless charging function, the display panel 10 may use the induction electric energy E as the power source for display; and when not executing the wireless charging function or being away from the wireless charging power supply 20, the display panel 10 may use the electric energy stored in the electric energy storage device 60 for display.

In this embodiment, the display pixel layer 120 is disposed on the induction coil layer 110. The second substrate 130 is disposed on the display pixel layer 120. If the display panel 10 is a liquid crystal display (LCD) panel, the display pixel layer 120 for example includes a liquid crystal layer and a pixel unit layer; and the second substrate 130 for example includes a polarizer and a color filter sheet. In addition, in the case that the display panel 10 is an organic light emitting diode display panel (OLED display panel), the display pixel layer 120 for example includes an organic light emitting diode pixel layer, and the second substrate 130 for example includes an indium tin oxide (ITO) transparent substrate. Furthermore, in the case that the display panel 10 is an electrophoretic display panel (EPD panel), the display pixel layer 120 for example includes a microcup layer or a microcapsule layer, which has a plurality of color pigment particles, and an adhesive layer; and the second substrate 130 for example includes an indium tin oxide (ITO) transparent substrate. In other words, the display panel 10 having the wireless charging function of the embodiment is applicable to different display technologies. However, it is noted that the aforementioned are examples of the invention and should not be construed as limitations to the scope of the invention. Moreover, in this embodiment, the display pixel layer 120 collaborates with a panel driving device (not shown) of a display to execute an image display function. In the liquid crystal display panel, the panel driving device may be a driving device, such as a source driver, a gate driver, or a timing controller of the liquid crystal display. In addition, in the electrophoretic display panel, the panel driving device may be a driving device of the electrophoretic display panel for driving the electrophoretic display panel to display images.

In this embodiment, as shown in FIG. 1, the display pixel layer 120 includes an active area AA and a peripheral circuit area PA adjacent to the active area AA. Generally speaking, the active area AA has display pixels that are configured denser, and the images are mainly provided by the dense display pixels of the display panel. However, a circuit routing for the dense display pixels in the active area AA usually passes through and gathers in the peripheral circuit area PA. In order to prevent the circuit routing in the peripheral circuit area PA from being seen by the user, the peripheral circuit area PA is usually covered. For instance, in this embodiment, the induction coil 111 is disposed in an area of the induction coil layer 110 that corresponds to the peripheral circuit area PA. An area of the second substrate 130 that corresponds to the peripheral circuit area PA may be opaque to prevent the circuit routing in the peripheral circuit area PA from being directly seen. It is noted that this design may be altered according to actual application, and the invention is not limited to the above.

Figure 3A:
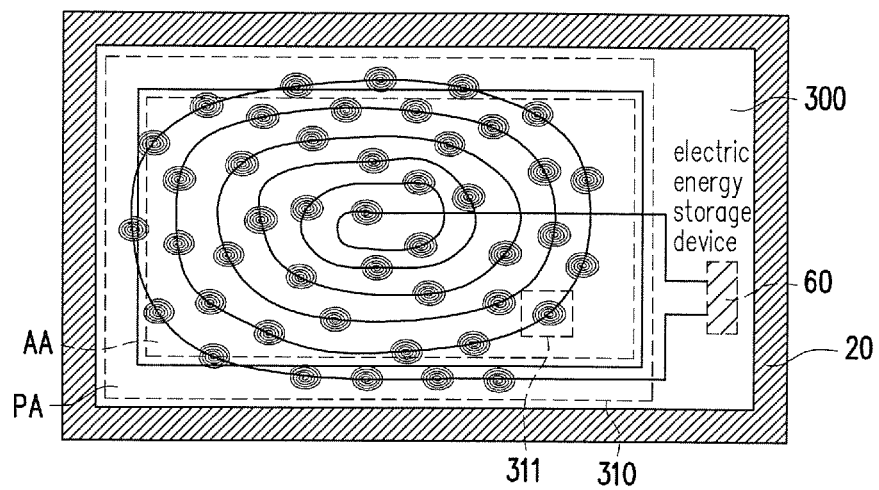
FIG. 3a is a schematic top view of a display panel according to another embodiment of the invention.
Figure 3B:
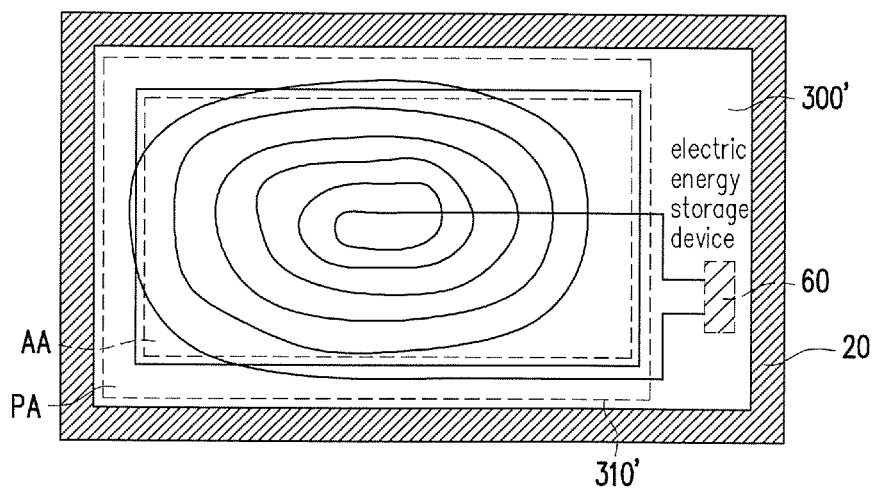

FIG. 3a is a schematic top view of a display panel according to another embodiment of the invention. FIG. 3b is a schematic view illustrating an alteration of the display panel in the embodiment of FIG. 3a. Referring to FIG. 3a and FIG. 3b, a first substrate 300 in this embodiment is similar to the first substrate 100 in the display panel of FIG. 1, and a main difference for example lies in that: an induction coil 311 in this embodiment is disposed in an area of an induction coil layer 310 that corresponds to the peripheral circuit area PA and is also disposed in an area of the induction coil layer 310 that corresponds to the active area AA. To be more specific, the induction coil 311 may be formed of a transparent conductive material, such as indium tin oxide (ITO). Therefore, the induction coil 311 may not only be disposed in the area of the induction coil layer 310 that corresponds to the peripheral circuit area PA but also be disposed in the area of the induction coil layer 310 that corresponds to the active area AA without excessively affecting the image quality. Generally speaking, the area of the induction coil layer 310 and the number of the induction coils may be increased to increase the generation of the induction electric energy E, so as to raise the efficiency of wireless charging. Take FIG. 1 as an example, because the induction coil layer 110 contains a plurality of the induction coils 111, the efficiency of receiving the induction electromagnetic wave 50 is enhanced. It is noted that the circular induction coils 111 in the embodiment of FIG. 1 may be replaced with the elliptic induction coils 311 of FIG. 3a to achieve a similar effect. Moreover, a coil shape or structure of the induction coil layer 310 on the first substrate 300 of FIG. 3a may be altered to an induction coil layer 310' on a first substrate 300' of FIG. 3b to achieve similar effect.

Figure 4:
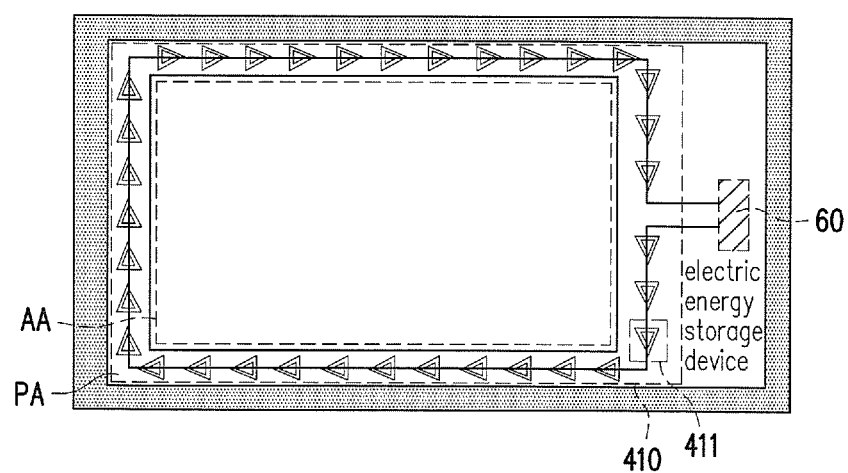
FIG. 4 to FIG. 6 respectively illustrate variations of a shape of an induction coil according to different embodiments of the invention.
Figure 5:
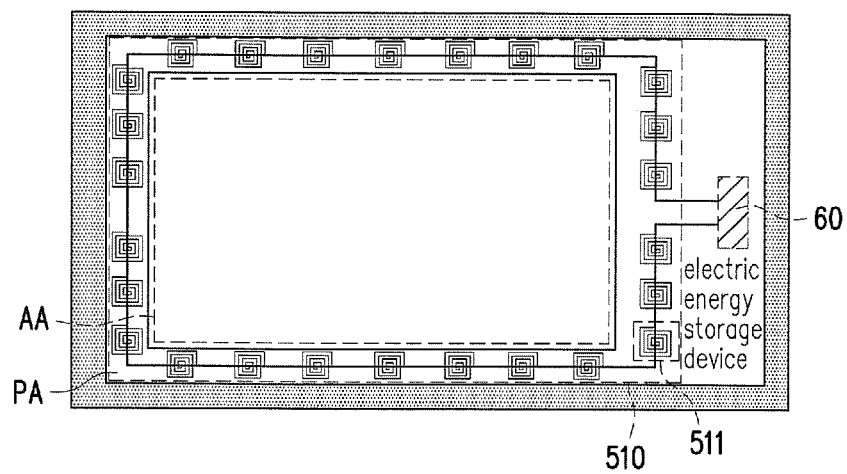
Figure 6:
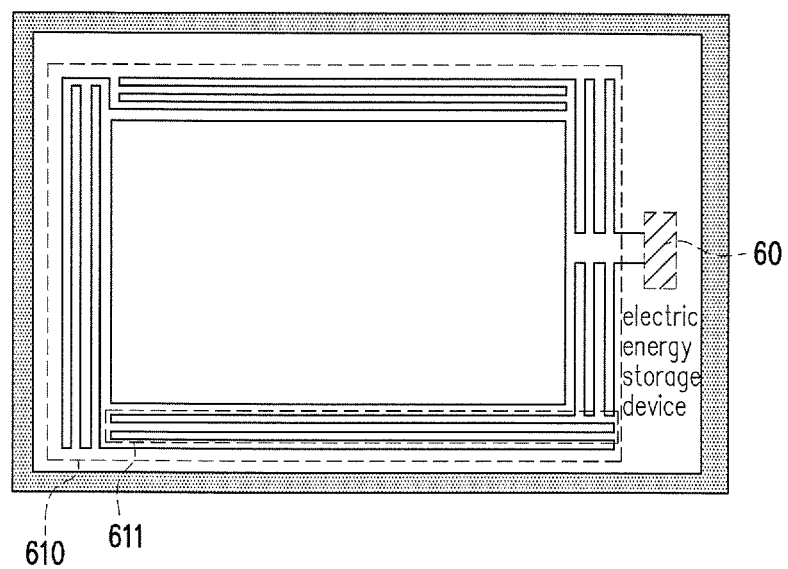

FIG. 4 to FIG. 6 respectively illustrate variations of a shape of an induction coil according to different embodiments of the invention. With reference to FIG. 4 to FIG. 6, the embodiments of FIGS. 4-6 are similar to the embodiment of FIG. 1, and the differences respectively lie in that: an induction coil 411 in an induction coil layer 410 in the embodiment of FIG. 4 has a triangular shape, for example. Moreover, an induction coil layer 510 as shown in FIG. 5 includes a plurality of square induction coils 511. Furthermore, an induction coil layer 610 as shown in FIG. 6 includes a plurality of rectangular coils 611. It should be noted that the induction coils contained in the induction coil layer may have a polygonal shape. In the embodiments of FIG. 4 to FIG. 6, the induction coils are disposed in the area of the induction coil layer that corresponds to the peripheral circuit area PA. In other embodiments, the induction coils are disposed in the areas of the induction coil layer that respectively correspond to the peripheral circuit area PA and the active area AA. It is noted that FIG. 4 to FIG. 6 are simply examples of the invention and should not be construed as limitations to the scope of the invention.

In conclusion of the above, in the exemplary embodiments of the invention, the induction coils are disposed on the first substrate of the display panel for receiving the induction electromagnetic wave emitted by the wireless charging power supply, so as to generate electric energy. The display panel uses the induction electric energy as the power source for display or outputs the induction electric energy to the electric energy storage device via the output ends for storage or later use. The induction coil layer may be disposed in the peripheral circuit area or in both the active area and the peripheral circuit art. The shape of the induction coil layer may be altered according to actual need, so as to achieve good generation efficiency of induction electric energy. Moreover, the induction coil layer of the embodiments of the invention is applicable to different display technologies, such that the display panel has the wireless charging function and has the potential of miniaturization and portability.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A display panel having a wireless charging function, the display panel comprising:
    a first substrate;
    an induction coil layer disposed on the first substrate and comprising induction coils arranged and serially connected in a loop trajectory, and the induction coil layer being adapted for collaborating with a wireless charging power supply to execute the wireless charging function;
    a display pixel layer disposed on the induction coil layer, wherein when the display panel is placed on the wireless charging power supply, the induction coil layer is located between the display pixel layer and the wireless charging power supply;
    a second substrate disposed on the display pixel layer; and
    an electric energy storage device electrically connected to the induction coil layer, wherein when collaborating with the wireless charging power supply to execute the wireless charging function, the display panel uses an induction electric energy generated by the induction coils to execute an image display function; and when not executing the wireless charging function or being away from the wireless charging power supply, the display panel uses the electric energy stored in the electric energy storage device to execute the image display function.

2. The display panel according to claim 1, wherein the display pixel layer comprises an active area and a peripheral circuit area adjacent to the active area, and the induction coils are disposed in an area of the induction coil layer that corresponds to the peripheral circuit area.

3. The display panel according to claim 2, wherein the induction coils are further disposed in an area of the induction coil layer that corresponds to the active area.

4. The display panel according to claim 1, wherein a shape of one of the induction coils is circular or elliptic.

5. The display panel according to claim 1, wherein a shape of one of the induction coils is polygonal.

6. The display panel according to claim 1, wherein the induction coils are adapted for receiving an induction electromagnetic wave supplied by the wireless charging power supply and generating the induction electric energy accordingly.

7. The display panel according to claim 1, wherein the induction coil layer comprises a first output end and a second output end and outputs the induction electric energy generated by the induction coil layer to the electric energy storage device via the first output end and the second output end.

8. The display panel according to claim 1, wherein the first substrate is a hard substrate.

9. The display panel according to claim 1, wherein the first substrate is a flexible substrate.

10. The display panel according to claim 1, wherein a material of the induction coils comprises a metal or a conductive metal oxide.

11. A display panel having a wireless charging function, the display panel comprising:
    a first substrate;
    an induction coil layer disposed on the first substrate and comprising coplanar induction coils arranged and serially connected along a loop trajectory on a plane, and the induction coil layer being adapted for collaborating with a wireless charging power supply to execute the wireless charging function;
    a display pixel layer disposed on the induction coil layer, wherein when the display panel is placed on the wireless charging power supply, the induction coil layer is located between the display pixel layer and the wireless charging power supply;
    a second substrate disposed on the display pixel layer; and
    an electric energy storage device electrically connected to the induction coil layer, wherein when collaborating with the wireless charging power supply to execute the wireless charging function, the display panel uses an induction electric energy generated by the induction coils to execute an image display function; and when not executing the wireless charging function or being away from the wireless charging power supply, the display panel uses an electric energy stored in the electric energy storage device to execute the image display function.

* * * * *